US010315706B2

United States Patent
Meskin et al.

(10) Patent No.: US 10,315,706 B2
(45) Date of Patent: Jun. 11, 2019

(54) ADJUSTABLE HOOD-STOP FOR A MOTOR VEHICLE

(71) Applicant: Valeo North America, Inc., Troy, MI (US)

(72) Inventors: Issmail Meskin, Auburn Hills, MI (US); Antonio Babler, Auburn Hills, MI (US)

(73) Assignee: Valeo North America, Inc., Troy, MI (US)

( * ) Notice: Subject to any disclaimer, the term of this patent is extended or adjusted under 35 U.S.C. 154(b) by 0 days.

(21) Appl. No.: 15/615,061

(22) Filed: Jun. 6, 2017

(65) Prior Publication Data

US 2018/0346036 A1 Dec. 6, 2018

(51) Int. Cl.
*B62D 25/10* (2006.01)
*B62D 25/12* (2006.01)
*E05B 83/24* (2014.01)

(52) U.S. Cl.
CPC ............ *B62D 25/12* (2013.01); *B62D 25/105* (2013.01); *E05B 83/24* (2013.01); *E05Y 2900/536* (2013.01)

(58) Field of Classification Search
CPC ...... B62D 25/12; B62D 25/105; B62D 25/10; E05B 83/24; E05B 83/16; E05B 83/20; E05B 83/14; E05B 83/26; E05B 83/28
See application file for complete search history.

(56) References Cited

U.S. PATENT DOCUMENTS

| | | | | |
|---|---|---|---|---|
| 4,653,968 A * | 3/1987 | Rapata | ................... | E05F 5/022 16/19 |
| 5,482,348 A * | 1/1996 | Mass | ...................... | E05F 5/022 16/82 |
| 5,595,416 A * | 1/1997 | Horwill | ............... | B62D 29/048 296/91 |
| 6,119,309 A * | 9/2000 | Lu | ......................... | A45C 13/26 16/110.1 |
| 6,507,976 B2 * | 1/2003 | Ichimaru | ................ | E05F 5/022 16/2.1 |
| 7,114,217 B2 * | 10/2006 | Matsuzawa | ............ | E05F 5/022 16/2.2 |
| 7,618,088 B2 * | 11/2009 | Bauer | .................... | E05F 5/022 16/82 |
| 7,690,722 B2 * | 4/2010 | Boggess | ................ | B60R 21/34 296/187.04 |
| 8,616,622 B2 * | 12/2013 | Davis | ..................... | B60R 21/34 180/69.2 |
| 8,662,236 B2 * | 3/2014 | Koestler | ................ | B60R 21/38 180/274 |
| 8,720,975 B1 * | 5/2014 | Perez | ................... | B60Q 1/0491 296/187.04 |

(Continued)

*Primary Examiner* — James M Dolak
(74) *Attorney, Agent, or Firm* — Osha Liang LLP

(57) ABSTRACT

An adjustable hood-stop unit for a front-end bolster of a motor vehicle is disclosed. The adjustable hood-stop includes a bumper stop, a retainer made of a plastic material that receives the bumper stop, and a plurality of threads integrated along an internal surface of the retainer. The retainer is over-molded onto a hole in the front-end bolster, the plurality of threads extend on a partial length of the internal surface of the retainer at a predetermined rotation degree, and the plurality of threads are discontinued.

7 Claims, 10 Drawing Sheets

(56) References Cited

U.S. PATENT DOCUMENTS

| | | | |
|---|---|---|---|
| 8,991,537 B2* | 3/2015 | Snede | E05F 5/022 |
| | | | 180/69.2 |
| 9,120,443 B2* | 9/2015 | Townson | E05F 5/022 |
| 9,580,951 B2* | 2/2017 | Duprez | E05F 5/022 |
| 9,963,917 B2* | 5/2018 | Reyes Luna | E05F 5/022 |
| 10,094,148 B2* | 10/2018 | Bendel | E05B 81/06 |
| 10,100,565 B2* | 10/2018 | Waskie | B62D 25/12 |
| 10,145,154 B2* | 12/2018 | Ferri | E05B 83/24 |

* cited by examiner

ADJUSTABLE HOOD-STOP FOR A MOTOR VEHICLE

BACKGROUND OF INVENTION

Adjustable hood-stops are assembly units disposed on the front-end bolster of vehicles. These units are often designed to prevent any impact between the vehicle hood and the vehicle headlights. Further, the use of adjustable hood-stops may enable the transfer of forces upon closure of the vehicle hood or upon vehicle impact. Depending on the specific vehicle model, the front-end bolster may contain at least two adjustable and two non-adjustable hood stops. These adjustable hood-stop units include a retaining portion, that may be integrated or detachable, on the body of the front-end bolster that receives a threaded bumper stop piece.

SUMMARY OF INVENTION

In general, in one aspect, the invention relates to an adjustable hood-stop unit for a front-end bolster of a motor vehicle comprising a bumper stop, a retainer made of a plastic material that receives the bumper stop, and a plurality of threads integrated along an internal surface of the retainer, wherein the retainer is over-molded onto a hole in the front-end bolster, wherein the plurality of threads extend on a partial length of the internal surface of the retainer at a predetermined rotation degree, and wherein the plurality of threads are discontinued.

In general, in one aspect, the invention relates to a method for manufacturing an adjustable hood-stop unit for a front-end bolster of a motor vehicle comprising injecting a molten material onto a metal mold, over-molding the molten material in a first direction and a second direction on the metal mold to form a retainer, wherein the molten material is a plastic material, wherein the second direction is opposite to the first direction, wherein a plurality of threads are over-molded on a partial length of the internal surface of the retainer at a predetermined rotation degree, and wherein the plurality of threads are discontinued.

Other aspects and advantages of the invention will be apparent from the following description and the appended claims.

DETAILED DESCRIPTION

Figure 1:
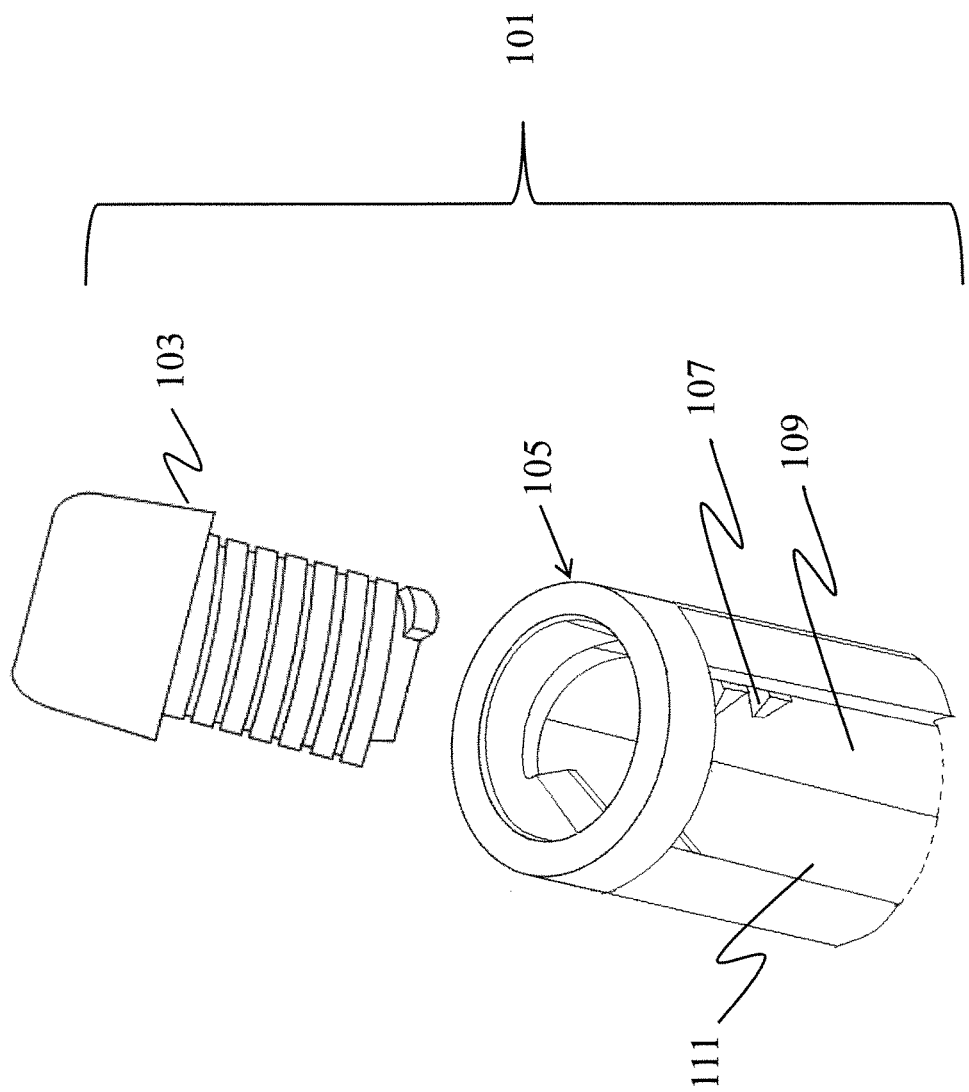
FIG. 1 shows an adjustable hood-stop unit for a front-end bolster of a motor vehicle according to one or more embodiments of the invention.

Specific embodiments will now be described in detail with reference to the accompanying figures. Like elements in the various figures are denoted by like reference numerals for consistency. Like elements may not be labeled in all figures for the sake of simplicity.

In the following detailed description, numerous specific details are set forth in order to provide a more thorough understanding of one or more embodiments of the invention. However, it will be apparent to one of ordinary skill in the art that the disclosure may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create a particular ordering of the elements nor to limit any element to being only a single element unless expressly disclosed, such as by the use of the terms "before," "after," "single," and other such terminology. Rather, the use of ordinal numbers is to distinguish between the elements. By way of an example, a first element is distinct from a second element, and the first element may encompass more than one element and succeed (or precede) the second element in an ordering of elements.

It is to be understood that the singular forms "a," "an," and "the" include plural referents unless the context clearly dictates otherwise. Thus, for example, reference to "a horizontal beam" includes reference to one or more of such beams.

Terms like "approximately," "substantially," etc., mean that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

In general, embodiments of the invention relate to development of composite solutions for structural parts of a motor vehicle as a key solution to face the challenge of CO2 emission reduction and to keep the level of performance that is requested by the automotive manufacturers. Specifically, embodiments of the invention provide a retaining portion of an adjustable hood-stop unit for the front-end module of a motor vehicle that integrates the bumper stop in the composite/plastic structure.

FIG. 1 shows an adjustable hood-stop unit for a front-end bolster of a motor vehicle according to one or more embodiments of the invention. The adjustable hood-stop unit may be of varying sizes, shapes, and forms depending on the vehicles to be fitted. The adjustable hood-stop unit (101), as shown in FIG. 1, has multiple components including a bumper stop (103) and a retainer (105). The retainer for the adjustable hood-stop unit further includes a plurality of threads (107), an internal surface (109), and a plurality of openings (111). The various components and structures of the adjustable hood-stop (101) listed above may connect directly or indirectly with one another. Each of these components are described below in more detail.

In one or more embodiments, the adjustable hood-stop unit (101) includes a retainer (105) and a bumper stop (103). The adjustable hood-stop unit (101) may be made of any thermoplastic composite material including plastic, resin, elastomer, glass-fiber, carbon, or any other suitable structural fiber.

One or more embodiments of the present invention achieves a reduction in the vehicle's mass through replacing existing metallic materials with composite materials shaped in a predetermined geometry that has been simulated to achieve the same level of mechanical performances. This advantage complies with the constraint of mass reduction requested by the Original Equipment Manufacturer (OEM), which encourages suppliers to propose innovative solutions that enable the reduction of the vehicle's mass while being able to keep the same level of mechanical performances.

The bumper stop (103) may be, but is not limited to, any helical shape such as that of large-head screw. The head of the bumper stop (103) may be made of a soft material that may be, but is not limited to, rubber, plastic, elastomer, carbon fiber, etc. that are able to disperse a force exerted on the material as the hood of the vehicle is slammed closed on the bumper stop (103).

The retainer (105) may be of any shape so long as the retainer (105) is structurally able to securely receive the bumper stop (103). In one or more embodiments, the retainer (105) is manufactured as one piece through an over-molding process in two opposite directions. In a non-limiting example, the retainer (105) may have a cylindrical shape with a hollow center. The body of the retainer (105) further includes a plurality of threads (107), an internal surface (109), and a plurality of openings (111). In one or more embodiments, the plurality of threads (107) are made of the same material as the retainer (105).

In steel parts, a helical structure is used to accommodate those hood stoppers. In the case of the use of composite materials, the realization of an helical shape is not possible. In that case, the weakness of a simple skin shaped to an helical shape would cause the composite material to break before absorbing the complete load.

In one or more embodiments, each of a height of the bumper stop (103) and the retainer (105) may vary proportionally with respect to the type of vehicle the adjustable hood-stop unit is to be fitted in. Further, one of ordinary skill in the art would further appreciate that the amount of the portion of the bumper stop (103) that is connected into the body of the retainer (105) is adjustable dependent on the whether or not the hood of the vehicle will impact the headlights upon closure.

As also shown in FIG. 1, the plurality of threads (107) are integrated along the internal surface (109) of the retainer (105) and are configured to receive the threaded structure of the bumper stop (103). In one or more embodiments, the plurality of threads (107) extend on a partial length of the internal surface of the retainer (105) at a predetermined angle. One of ordinary skill in the art would appreciate that the predetermined angle may be, but is not limited to, an angle within the range of 77.5 degrees to 85 degrees. Further, the angle formed by the two side non-parallel portions of the plurality of threads (107) may be between 15 and 30 degrees, as shown below:

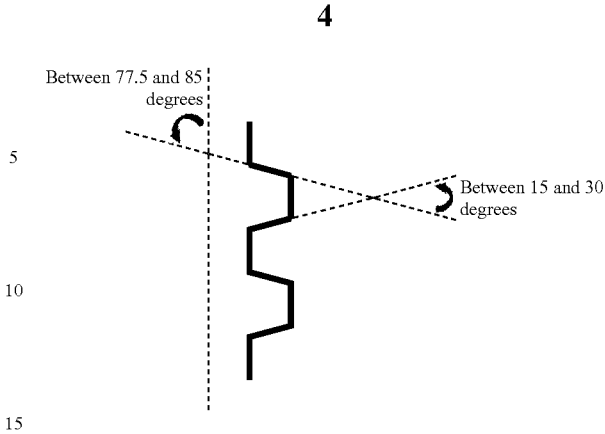

As shown in FIG. 1, in a non-limiting example, the plurality of threads (107) are integrated on a 50% portion that covers two 25% portions of the internal surface (109) of the retainer (105).

In one or more embodiments, the retainer (105) includes a plurality of openings (111) on the side of the retainer (105) body. The retainer (105) may contain, but is not limited to, at least two openings (111) that are opposite to each other. In a non-limiting example, the plurality of openings (111) on the body of the retainer (105) enables the dispersion of force to prevent the material of the retainer (105) from cracking due to excessive force applied as the bumper stop (103) is being screwed into the retainer and also as force is applied onto the bumper stop (103) as the hood is slammed closed. In one or more embodiments, the plurality of openings (111) enable the retainer (105) to be over-molded in two over-molding directions.

In one or more embodiments, the plurality of threads (107) integrated along the internal surface (109) of the retainer are discontinued at the edge of the openings (111). In a non-limiting example, the plurality of threads are discontinued because the composite material is not robust enough to support a large amount of force. Further, if a continuous threaded structure breaks under application of too much force, the entire threaded structure would become unusable.

Unlike metallic material, the thermoplastic composite material is not robust enough to support the force exerted on the internal surface of the retainer if the bumper-stop is too tightly fitted into the retainer body. In one or more embodiments, openings are provided on the side-walls of the retainer body. The opening enables the force to be redirected outwards without causing direct damage to the retainer body. Further, the openings allow the over-molding of the retainer to be conducted in two separate directions, resulting in a more stable structure and other advantages that will be described further in the description of the over-molding method.

Figure 2A:
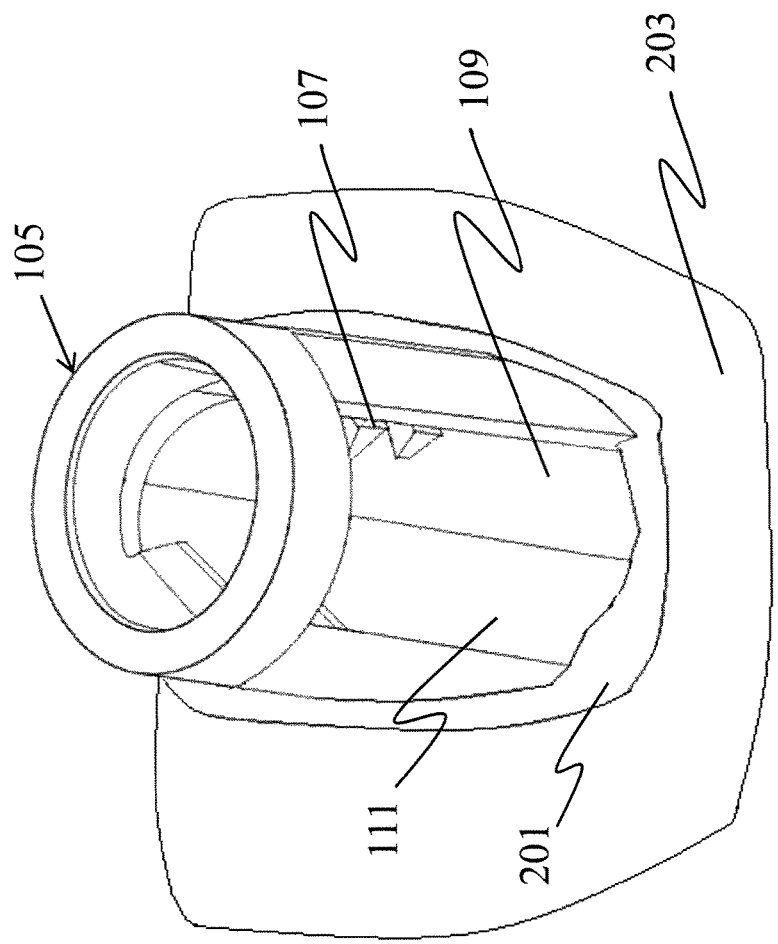
FIG. 2A shows a first view of a retainer for an adjustable hood-stop unit according to one or more embodiments of the invention.
Figure 2B:
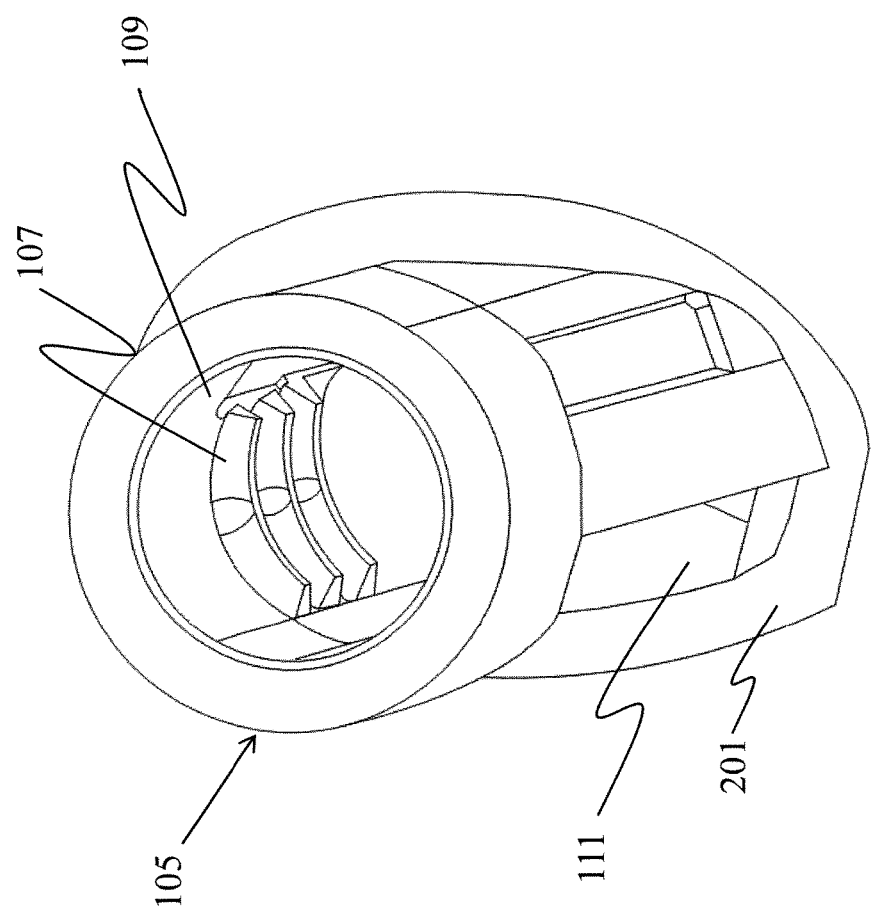
FIG. 2B shows a second view of a retainer for an adjustable hood-stop unit according to one or more embodiments of the invention.

FIG. 2A and FIG. 2B shows two different views of a retainer for an adjustable hood-stop unit according to one or more embodiments of the invention. The adjustable hood-stop unit may be of varying sizes, shapes, and forms depending on the vehicles to be fitted. The adjustable hood-stop unit (101), as shown in FIGS. 2A and 2B, has multiple components including a retainer (105). The retainer for the adjustable hood-stop unit further includes a plurality of threads (107), an internal surface (109), and a plurality of openings (111). Each of these components have been described with respect to the adjustable hood-stop unit (101) of FIG. 1. In one or more embodiments, the system shown in FIG. 2A and FIG. 2B further includes a hole (201) and a vehicle front-end bolster (203). The various components and structures listed above may connect directly or indirectly with one another. The hole (201) and the vehicle front-end bolster (203) are described below in more detail.

In one or more embodiments, the hole (201) may be, but is not limited to, any type of opening with any type of shape. In a non-limiting example, the shape of the hole (201) is proportional to the size of the retainer (105). The front-end bolster (203) may be of any shape and structure dependent on the make and model of the vehicle the front-end bolster (203) is to be fitted into. As shown in FIG. 2A, the hole (201) is directly formed on the surface of the body of the front-end bolster (203).

As shown in FIG. 2A and FIG. 2B, the retainer (105) for the adjustable hood-stop (101) presented in FIG. 1 is directly integrated into the hole (201) on the front-end bolster (203) of the motor vehicle. In one or more embodiments, the retainer (105) is directly over-molded onto the hole (201) on the front-end bolster (203) of the motor vehicle to become a single component with the front-end bolster (203).

In one or more embodiments, an advantage is achieved through direct integration of the retainer by over-molding the retainer directly onto the front-end bolster of the motor vehicle. The process of directly over-molding the retainer onto the hole would not only save additional cost for assembly but also prevent the realization of additional tooling.

As also shown in the first view of the retainer (105) for the adjustable hood-stop unit (101) presented in FIG. 2A, the plurality of threads (107) that align two 25% portions of the internal surface (109) of the retainer (105) are opposite to each other and discontinued at the openings (111).

In a second view of the retainer (105) for the adjustable hood-stop unit (101) presented in FIG. 2B, a full view of a plurality of threads (107) within a 25% portion of the internal surface (109) of the retainer (105) is shown. In one or more embodiments, the plurality of threads (107) extend only on a partial length of the internal surface (109) of the retainer (105). In one or more embodiments, each of the 25% portion of the internal surface (109) of the retainer (105) is molded with at least, but not limited to, three threads. One of ordinary skill in the art would appreciate that the number of threads to be molded on the internal surface (109) may be different based on the size, shape, and structure of the retainer depending on the make and model of the vehicle the retainer (105) is to be integrated into.

Figure 2C:
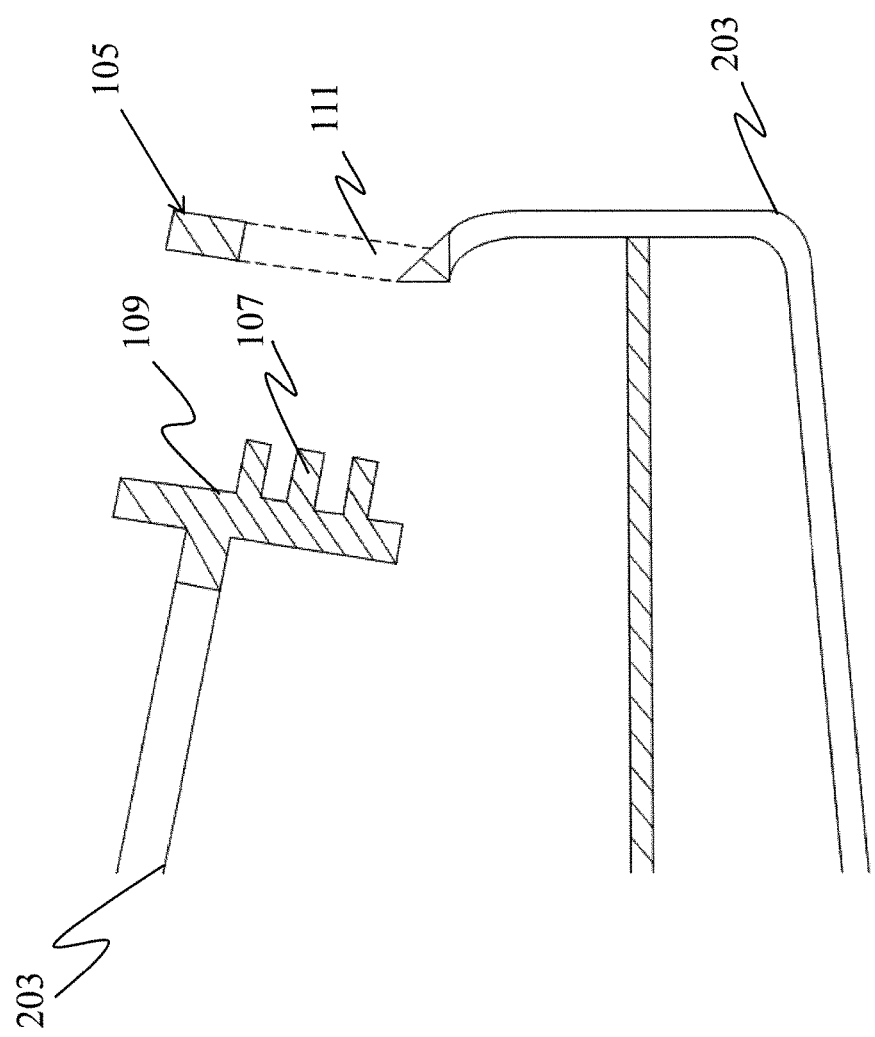
FIG. 2C shows a cross sectional view of a retainer for an adjustable hood-stop unit according to one or more embodiments of the invention.

FIG. 2C shows a cross sectional view of a retainer (105) for an adjustable hood-stop unit according to one or more embodiments of the invention shown in FIGS. 2A and 2B. The adjustable hood-stop unit (101, as shown in FIG. 1), as shown in FIG. 2C, includes a cross section of the retainer (105, as shown in FIG. 2A). The retainer for the adjustable hood-stop unit further includes a plurality of threads (107), an internal surface (109), and a plurality of openings (111), a hole (not labeled), and a front-end bolster (203) of a vehicle. Each of these components have been described with respect to the adjustable hood-stop unit of FIG. 1 and the retainer for an adjustable hood-stop unit of FIG. 2A.

As shown in FIG. 2C, the retainer (105), denoted by the shaded portions, is directly integrated into a hole on the front-end bolster (203), denoted by the solid portions, of the vehicle. The external surfaces of the retainer body are directly molded onto the surface of the hole on the front-end bolster (203), resulting in a single structure that does not require any further assembly between the retainer (105) and the front-end bolster (203).

As described above, rather than using a process where the retainer is first produced as a separate component and then assembled onto the front-end bolster (203), directly over-molding the retainer onto the front-end bolster (203) prevents the need for any additional cost and tooling for assembling the two components together.

Figure 3:
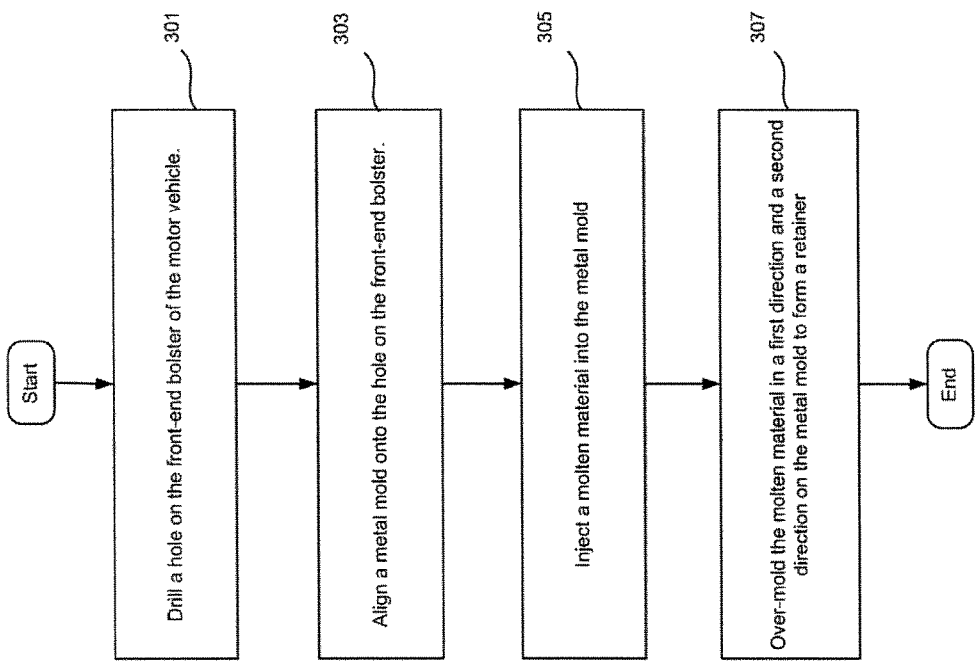
FIG. 3 shows a method for manufacturing a retainer for an adjustable hood-stop unit according to one or more embodiments of the invention.

FIG. 3 shows a method for manufacturing a retainer for an adjustable hood-stop unit according to one or more embodiments of the invention. While the various steps in FIG. 3 are presented and described sequentially, one of ordinary skill in the art will appreciate that some or all of the steps may be executed in different orders, may be combined or omitted, and some or all of the steps may be executed in parallel.

In Step 301, a hole is drilled into the front-end bolster of the motor vehicle. In one or more embodiments, at least two holes are drilled onto the front-end bolster of the motor vehicle for the placement of two adjustable hood-stop units.

One of ordinary skill in the art would appreciate that the number of holes to be drilled on the front-end bolster depends on the type of vehicle the front-end bolster is to be fitted. In one or more embodiments, the hole can be drilled using any power tool or equipment that is able to provide a force large enough to drill through the front-end bolster. However, it is important to note that too much force should not be applied when drilling to prevent cracking and damaging the material of the front-end bolster.

Further, one of ordinary skill in the art would appreciate that the drilling step, Step 301, may be omitted by directly obtaining a front-end bolster that already includes the required holes.

In step 303, a metal mold is aligned onto the hole on the front-end bolster from Step 301. In one or more embodiments, the metal mold contains the shape and structure of the retainer for the adjustable hood-stop unit.

In Step 305, a molten material is injected into a metal mold. The molten material may be, but is not limited to, a thermoplastic composite material such as plastic, resin, elastomer, or any other suitable material. Before being injected into the metal mold, the molten material may be melted from an initial cooled thermoplastic composite material using industrial ovens, heated barrels, etc.

In Step 307, the molten material is over-molded in a first direction and a second direction on the metal mold to form the retainer. In one or more embodiments, the first direction of over-molding is opposite to the second direction of over-molding.

Figure 4:
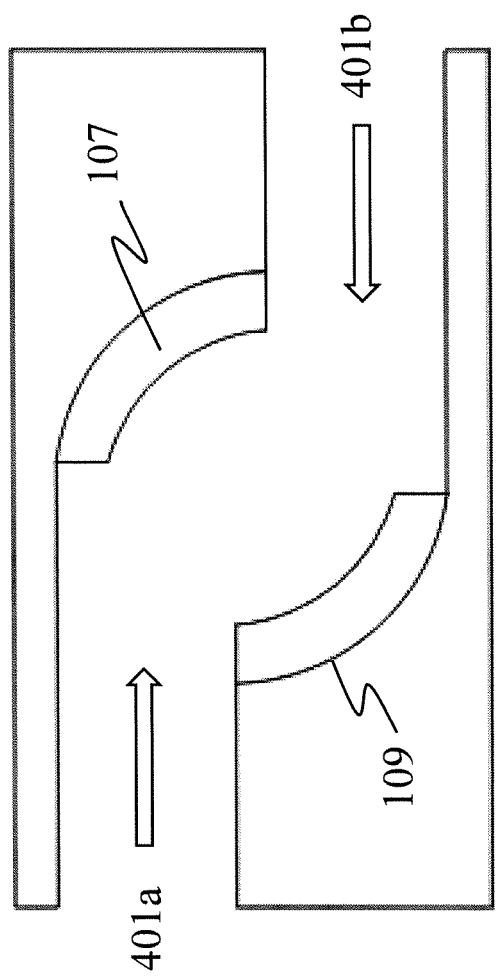
FIG. 4 shows a structural view of the over-molding process for a retainer according to one or more embodiments of the invention.

FIG. 4 shows a structural view of the over-molding process for a retainer according to one or more embodiments of the invention. The structural view of the retainer (105) for an adjustable hood-stop unit (101) during the over-molding process, as shown in FIG. 4, has multiple components including a plurality of threads (107) and an internal surface (109). The over-molding process further includes a first direction of over-molding (401a) and a second direction of over-molding (401b). The first and second directions of over-molding (401a, 401b) are described below in more detail.

In one or more embodiments, the plurality of threads (107) on the internal surface (109) of the retainer (105) is formed through the over-molding process described in Step 403 of the over-molding process. In a non-limiting example, the plurality of threads (107) that cover 50% of the internal surface (109) of the retainer (105) is balanced in two directions during the over-molding Step 307 where 25% of the plurality of threads (107) is molded in the first over-molding direction and another 25% of the plurality of threads (107) is molded in the second over-molding direction opposite to the first over-molding direction.

Over-molding a composite component as an insert is a difficult process where the material of the component becomes very unstable after going through a heating step. Further, it is even more difficult to over-mold a composite component as an insert onto another pre-made composite component as the temperature of the heat may cause the pre-made component that is already cooled to be re-heated to its melting point.

The process of over-molding 25% of the composite insert structure in the first over-molding direction (401a) and 25% in the second over-molding direction (401b) opposite to the first over-molding direction (401a) prevents the entire surface of the pre-made composite component (the front-end bolster) from being heated by the molten material, therefore resulting in a stable structure both when over-molding and when cooled.

FIG. 5A to FIG. 5D show different views of a detachable retainer for an adjustable hood-stop unit according to one or more embodiments of the invention. The detachable retainer for an adjustable hood-stop unit may be of varying sizes, shapes, and forms depending on the vehicles to be fitted. The detachable retainer for an adjustable hood-stop unit, as shown in FIG. 5A to FIG. 5D, has multiple components including a retainer (105). The retainer (105) further includes a plurality of threads (107), and an internal surface (109). Each of these components has been described with respect to the adjustable hood-stop unit (101) of FIG. 1. The detachable retainer further includes an outer ring (501), a first clip (503a), a second clip (503b), a first failure area (505a), a second failure area (505b), and an external surface (507). The various components and structures listed above may connect directly or indirectly with one another. The additional components are described below in more detail.

In one or more embodiments, the outer ring (501) may be made of any material including composites and thermoplastics. The benefit of these materials is a cohesion between the plastic and the composite materials. The outer ring (501) may be of any shape so long as the shape of the outer ring (501) fully encompasses the entire combination of the retainer (105) body and the first and second clips (503a, 503b). Specifically, the outer ring (501) is designed to sit on top on the surface of a vehicle front-end bolster when the retainer (105) is attached to the front-end bolster.

In one or more embodiments, the first and second clips (503a, 503b) are made of the same material as the outer ring (501). The first and second clips (503a, 503b) may be of any shape so long as each clip is able to securely attach to and latch onto the inner surface of the of the front-end bolster without causing damage to the front-end end bolster. Further, the structure of the first and second clips (503a, 503b) must be flexible enough to allow compression of the body of the first and second clips (503a, 503b) when inserting the clips into a hole on the front-end bolster. In a non-limiting example, the shape of the first and second clips (503a, 503b) may be J-shaped. In this example, the hook portion of the J-shaped clips would attach to the internal surface of the front-end bolster to securely attach the retainer to the front-end bolster. The size, length, width, and height of the first and second clips (503a, 503b) may vary based on size, length, width, and height of the front-end bolster.

In one or more embodiments, the first and second clips (503a, 503b) are attached onto an inner surface of the outer ring (501). Further, the first and second clips are also attached to an external surface (507) of the retainer (105) through first and second failure areas (505a, 505b). The first and second failure areas (505a, 505b) are made of the same material as the outer ring (501) and the first and second clips (503a, 503b). In one or more embodiments, the shape and size of the of the first and second failure areas (505a, 505b) may be of any shape and structure so long as the first and second failure areas (505a, 505b) are able to collapse upon vehicle impact.

In case the vehicle is to be sold in foreign jurisdictions such as Europe or Japan, the vehicle must at least have a fail-safe mechanism for pedestrian safety performance. In a non-limiting example, the retainer (105) is attached to the first and second clips (503a, 503b) through the first and second failure areas (505a, 505b). Upon pedestrian impact, the first and second failure areas (505a, 505b) will collapse, absorbing a part of the impact energy and reducing the maximum acceleration during the impact.

Further, in one or more embodiments, the integration of the first and second failure areas (505a, 505b) enables a progressive rupture mechanism on the front-end bolster. The progressive rupture is predetermined in simulation and the geometry of the failure areas is designed in a particular way to avoid a direct failure of the entire adjustable bumper-stop part. Upon impact, the bumper stop collapse under a constant force and that constant force is tuned to be under the limit that prevent for severe injuries to the pedestrian.

Figure 5A:
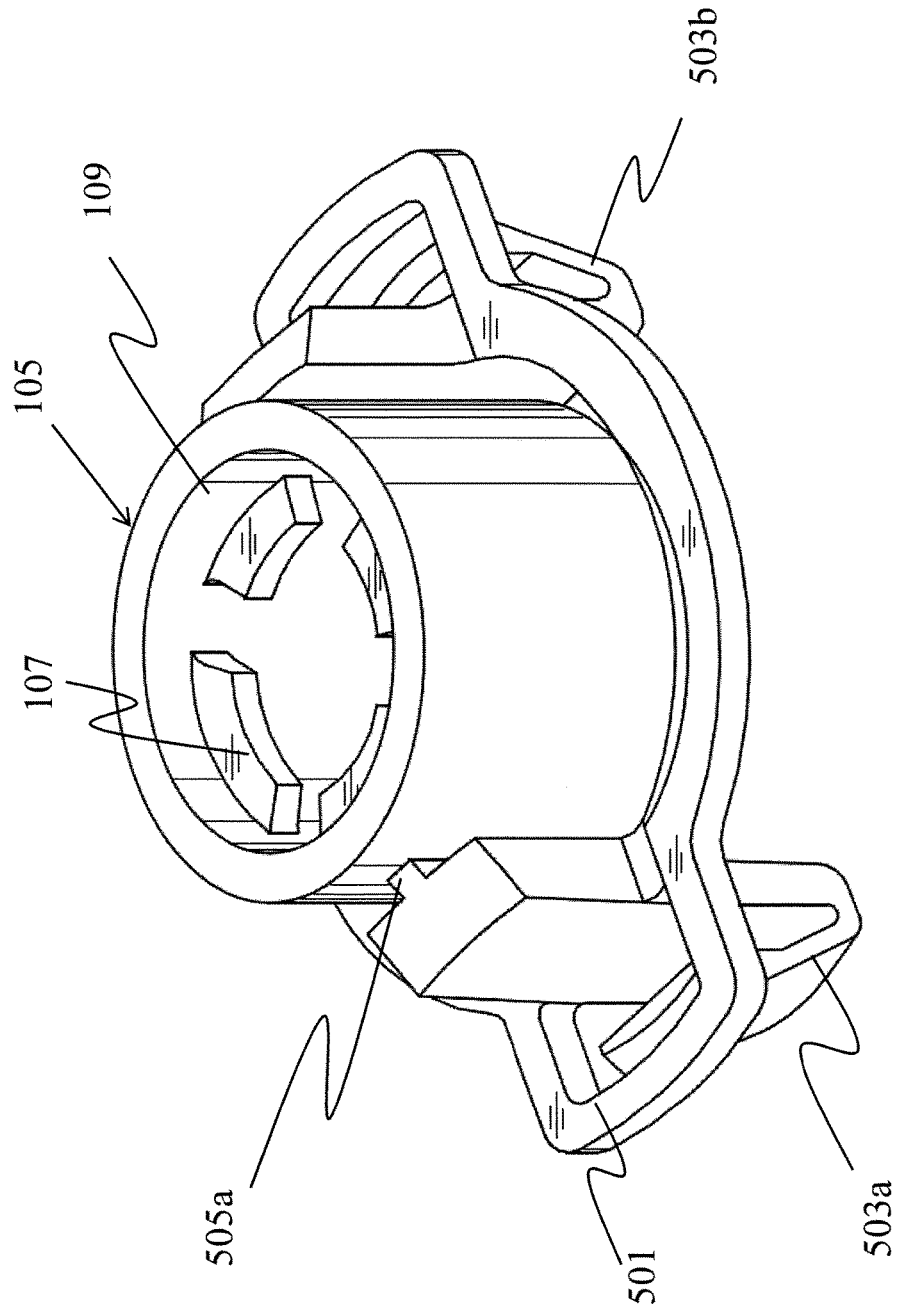
FIG. 5A shows a detachable retainer for an adjustable hood-stop unit according to one or more embodiments of the invention.

As also shown in FIG. 5A, in one or more embodiments, the retainer (105) may be made a separate being using the same over-molding process as described above in FIG. 3. In a non-limiting example, the retainer (105) body may be, but is not limited to, a single structure without any side openings. Further, in one or more embodiments, more than 50% of the internal surface (109) of the retainer may be aligned with a plurality of threads (107) in order to receive a bumper stop (not illustrated).

In one or more embodiments, the composite with the overmolded plastic is capable of resisting the same amount of force. This means that the drop of the hood would cause the composite to break if the whole part is not sized correctly with structure. When the composite is overmolded, it provides more flexibility to design and optimize the structure and provide the necessary amount of stiffness to absorb the force with ribbing, overmolded structure optimization.

Figure 5B:
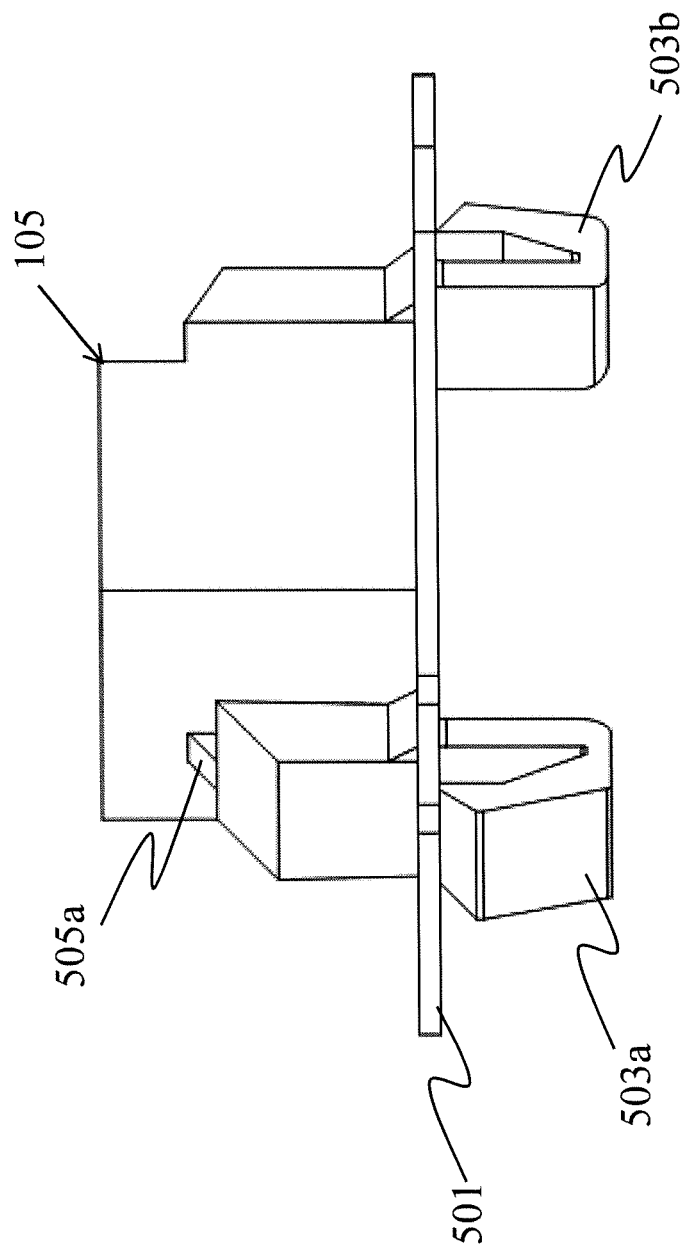
FIG. 5B shows a side view of a detachable retainer for an adjustable hood-stop unit according to one or more embodiments of the invention.

FIG. 5B shows a side view of the detachable retainer for an adjustable hood-stop unit shown in FIG. 5A.

Figure 5C:
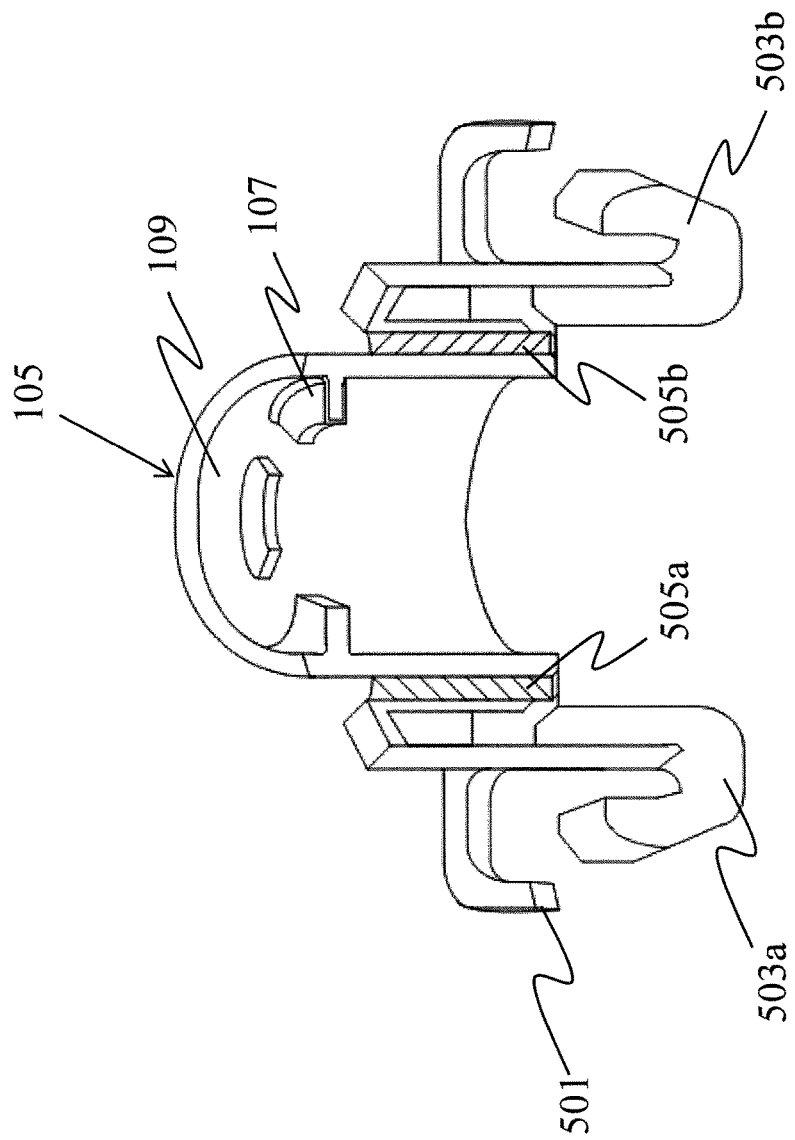
FIG. 5C shows a cross-sectional view of a detachable retainer for an adjustable hood-stop unit according to one or more embodiments of the invention.

FIG. 5C shows a cross sectional view of the detachable retainer for an adjustable hood-stop unit shown in FIG. 5A.

Figure 5D:
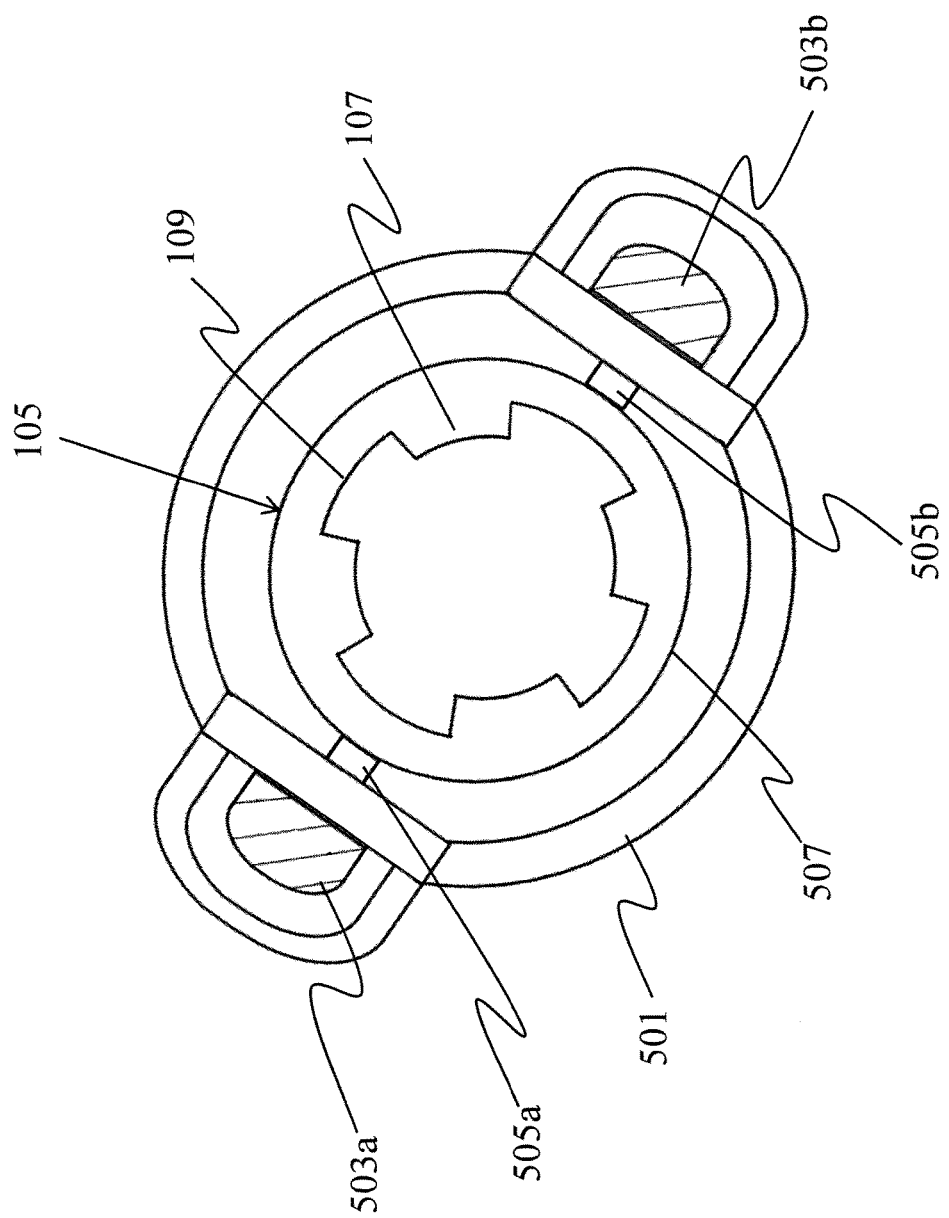
FIG. 5D shows a top view of a detachable retainer for an adjustable hood-stop unit according to one or more embodiments of the invention.

FIG. 5D shows a top view of the detachable retainer for an adjustable hood-stop unit shown in FIG. 5A.

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

What is claimed is:

1. An adjustable hood-stop unit for a front-end bolster of a motor vehicle comprising:
   a bumper stop;
   a retainer made of a plastic material that receives the bumper stop; and
   a plurality of threads integrated along a plurality of internal surfaces of the retainer,
   wherein the plurality of threads extend on a partial length of the internal surface of the retainer at a predetermined angle, and wherein the plurality of threads align such that the plurality of internal surfaces of the retainer are opposite to each other and discontinued.

2. The adjustable hood-stop unit according to claim 1, wherein
the retainer is over-molded onto a hole in the front-end bolster, and
the retainer is over-molded in a first direction opposite to a second direction.

3. The adjustable hood-stop unit according to claim 2, wherein the retainer further comprises a first opening that is opposite to a second opening.

4. The adjustable hood-stop unit according to claim 1, wherein the plurality of threads are integrated on 50% of the internal surface of the retainer.

5. The adjustable hood-stop unit according to claim 4, wherein the plurality of threads cover two 25% portions of the internal surface of the retainer.

6. The adjustable hood-stop unit according to claim 4, wherein the predetermined angle is 77.5 to 85 degrees.

7. The adjustable hood-stop unit according to claim 6, wherein the plastic material is one chosen from a group consisting of: plastic, resin, elastomer, glass-fiber, and carbon fiber.

* * * * *